US 10,805,164 B2

United States Patent
Han et al.

(10) Patent No.: US 10,805,164 B2
(45) Date of Patent: Oct. 13, 2020

(54) CONTROLLING PARALLEL DATA PROCESSING FOR SERVICE FUNCTION CHAINS

(71) Applicants: AT&T Intellectual Property I, L.P., Atlanta, GA (US); Regents of the University of Minnesota, Minneapolis, MN (US)

(72) Inventors: Bo Han, Bridgewater, NJ (US); Vijay Gopalakrishnan, Edison, NJ (US); Muhammad Bilal Anwer, Branchburg, NJ (US); Zhi-Li Zhang, Eden Prairie, MN (US); Yang Zhang, Saint Paul, MN (US)

(73) Assignees: AT&T INTELLECTUAL PROPERTY I, L.P., Atlanta, GA (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 7 days.

(21) Appl. No.: 16/221,237

(22) Filed: Dec. 14, 2018

(65) Prior Publication Data
US 2020/0195507 A1    Jun. 18, 2020

(51) Int. Cl.
*G06F 15/173* (2006.01)
*H04L 12/24* (2006.01)
(Continued)

(52) U.S. Cl.
CPC ...... *H04L 41/0893* (2013.01); *G06F 9/45558* (2013.01); *G06F 9/5077* (2013.01);
(Continued)

(58) Field of Classification Search
CPC ... H04L 41/0893; H04L 45/64; H04L 61/256; G06F 9/45558; G06F 9/5077
See application file for complete search history.

(56) References Cited

U.S. PATENT DOCUMENTS

| 7,031,304 B1 | 4/2006 | Arberg et al. |
| 7,752,078 B2 * | 7/2010 | Nakade ............. H04N 5/265 705/26.1 |

(Continued)

FOREIGN PATENT DOCUMENTS

| CN | 108092803 A | 5/2018 |
| CN | 108494574 A | 9/2018 |

(Continued)

OTHER PUBLICATIONS

Zhang et al. (Exploiting Parallelism for Virtual Network Functions in Service Chaining—2017) (Year: 2017).*

(Continued)

*Primary Examiner* — Razu A Miah (57) ABSTRACT

Systems and methods are disclosed for parallelizing service function chains. A method comprises receiving a sequential service function chain comprising a plurality of network functions, receiving a plurality of operations, determining at least two network functions are capable of being parallelized, aggregating operations of the plurality of operations associated with the at least two network functions into a network function segment, determining whether another network function is capable of being parallelized with the network function segment, based on the determining: aggregating an operation associated with the another network function into the network function segment when the another network function is capable of being parallelized with the network function segment, or pushing the network function segment as a completed segment of a hybrid service function chain when the another network function is not capable of being parallelized with the network function segment, and implementing the hybrid service function chain.

20 Claims, 5 Drawing Sheets

(51) Int. Cl.
  *H04L 29/12* (2006.01)
  *G06F 9/50* (2006.01)
  *G06F 9/455* (2018.01)
  *H04L 12/715* (2013.01)

(52) U.S. Cl.
  CPC ............ H04L 45/64 (2013.01); H04L 61/256 (2013.01); *G06F 2009/45595* (2013.01)

(56) References Cited

U.S. PATENT DOCUMENTS

| | | | |
|---|---|---|---|
| 8,213,313 B1 | 7/2012 | Doiron et al. | |
| 8,964,752 B2 | 2/2015 | Zhang et al. | |
| 9,130,774 B2 | 9/2015 | Regan | |
| 9,462,084 B2 | 10/2016 | Connor et al. | |
| 9,479,409 B2 | 10/2016 | Zhang et al. | |
| 9,706,472 B2 | 7/2017 | Roeland et al. | |
| 9,781,016 B1 | 10/2017 | Marquardt et al. | |
| 9,794,352 B2* | 10/2017 | Qiang | H04L 67/1002 |
| 9,923,815 B2 | 3/2018 | Assarpour et al. | |
| 10,003,676 B2 | 6/2018 | Tran et al. | |
| 10,044,572 B1 | 8/2018 | Marquardt et al. | |
| 10,050,859 B2 | 8/2018 | Kim et al. | |
| 10,110,707 B2 | 10/2018 | Hwang et al. | |
| 2002/0143938 A1* | 10/2002 | Alexander | H04L 41/0893 709/224 |
| 2004/0122890 A1* | 6/2004 | Watkinson | H04L 69/08 709/203 |
| 2005/0027837 A1* | 2/2005 | Roese | H04L 41/0893 709/223 |
| 2006/0031446 A1* | 2/2006 | Hamedi | H04L 41/0213 709/223 |
| 2006/0041658 A1* | 2/2006 | Nelson | H04L 41/0853 709/224 |
| 2006/0187857 A1* | 8/2006 | Imai | H04N 5/765 370/254 |
| 2007/0088834 A1* | 4/2007 | Litovski | H04L 63/0272 709/227 |
| 2007/0266141 A1* | 11/2007 | Norton | H04L 63/20 709/224 |
| 2008/0010377 A1* | 1/2008 | Nissennboim | H04L 63/20 709/226 |
| 2009/0006584 A1* | 1/2009 | Gregoire | H04N 21/4532 709/220 |
| 2009/0198811 A1* | 8/2009 | Yasui | H04L 41/0273 709/223 |
| 2009/0287837 A1* | 11/2009 | Felsher | G06F 19/328 709/229 |
| 2010/0235285 A1* | 9/2010 | Hoffberg | G06Q 20/401 705/75 |
| 2012/0005323 A1* | 1/2012 | Li | H04L 67/303 709/223 |
| 2012/0093163 A1* | 4/2012 | Miskowicz | H04L 12/413 370/400 |
| 2012/0198037 A1* | 8/2012 | Shelby | H04L 41/0253 709/223 |
| 2012/0275460 A1* | 11/2012 | Klotsche | H04L 49/552 370/392 |
| 2013/0191518 A1* | 7/2013 | Narayanan | H04L 41/12 709/220 |
| 2013/0212298 A1* | 8/2013 | Bunch | H04L 65/105 709/244 |
| 2013/0346504 A1* | 12/2013 | Huang | H04L 41/0853 709/204 |
| 2014/0025770 A1* | 1/2014 | Warfield | G06F 16/256 709/213 |
| 2014/0095685 A1 | 4/2014 | Cvijetic et al. | |
| 2014/0101058 A1* | 4/2014 | Castel | G06Q 10/109 705/305 |
| 2014/0189045 A1* | 7/2014 | Morris | H04L 45/74 709/217 |
| 2014/0189156 A1* | 7/2014 | Morris | H04L 45/745 709/238 |
| 2014/0280457 A1* | 9/2014 | Anton | G06F 16/256 709/202 |
| 2014/0351801 A1 | 11/2014 | Shin et al. | |
| 2015/0081890 A1* | 3/2015 | Richards | H04L 47/10 709/224 |
| 2015/0186143 A1 | 7/2015 | Tran et al. | |
| 2015/0333970 A1* | 11/2015 | Chiba | H04L 12/6418 370/401 |
| 2015/0358248 A1* | 12/2015 | Saha | H04L 47/70 709/226 |
| 2016/0182684 A1* | 6/2016 | Connor | G06F 9/45558 709/203 |
| 2016/0191443 A1* | 6/2016 | Dudley | H04L 51/36 709/206 |
| 2016/0301632 A1 | 10/2016 | Anand et al. | |
| 2016/0344611 A1 | 11/2016 | Ignacio Más Ivars et al. | |
| 2017/0094002 A1 | 3/2017 | Kumar et al. | |
| 2017/0214578 A1 | 7/2017 | Singh | |
| 2017/0279712 A1 | 9/2017 | Nainar et al. | |
| 2017/0346752 A1 | 11/2017 | Krishnamurthy et al. | |
| 2018/0041524 A1 | 2/2018 | Reddy et al. | |
| 2018/0091420 A1 | 3/2018 | Drake et al. | |
| 2018/0114012 A1 | 4/2018 | Sood et al. | |
| 2018/0114013 A1 | 4/2018 | Sood et al. | |
| 2018/0139098 A1 | 5/2018 | Sunavala et al. | |
| 2018/0262420 A1 | 9/2018 | Jaffer et al. | |
| 2018/0302343 A1 | 10/2018 | Lokman et al. | |
| 2018/0331951 A1 | 11/2018 | Boutros et al. | |

FOREIGN PATENT DOCUMENTS

WO 2016206742 A1 12/2016
WO 2018188738 A1 10/2018

OTHER PUBLICATIONS

"NFP: Enabling Network Function Parallelism in NFV." Sun, Chen, et al., Proceedings of the Conference of the ACM Special Interest Group on Data Communication ACM, 2017.
"Adaptive Service-Chain Routing for Virtual Network Functions in Software-Defined Networks." Dwaraki, Abhishek, and Tilman Wolf, Proceedings of the 2016 workshop on Hot topics in Middleboxes and Network Function Virtualization (pp. 32-37). ACM, 2016.
Katsikas, Georgios P., et al. "SNF: synthesizing high performance NFV service chains." PeerJ Computer Science 2 (2016): e98. https://peerj.com/articles/cs-98.pdf.
Sun, Chen, et al. "Nfp: Enabling network function parallelism in nfv." Proceedings of the Conference of the ACM Special Interest Group on Data Communication. (pp. 43-56). ACM, 2017. https://people.cs.clemson.edu/~hongxih/papers/SIGCOMM2017.pdf.
Zhang, Yang, et al. "Parabox: Exploiting parallelism for virtual network functions in service chaining." Proceedings of the Symposium on SDN Research. ACM, 2017. http://www.research.att.com/content/dam/sites/labs_research/content/publicationsN_ParaBox_Exploiting_Parallelism_for_Virtual_Network.pdf.
Chowdhary, Ankur, and Dijiang Huang. "SDN based Network Function Parallelism in Cloud." arXiv preprint arXiv:1811.00653 (2018). https://arxiv.org/pdf/1811.00653.pdf.
Kulkarni, Sameer G., et al. "REINFORCE: Achieving Efficient Failure Resiliency for Network Function Virtualization based Services." (2018). http://grace-liu.github.io/static/papers/18-CoNext-reinforce.pdf.
S. Kumar et al. Service Function Chaining Use Cases in Data Centers. Internet-Draft draft-ietf-sfc-dc-use-cases-05, IETF, 2016. https://tools.ietf.org/html/draft-ietf-sfc-dc-use-cases-05.pdf.
J. Napper et al. Service Function Chaining Use Cases in Mobile Networks. Internet-Draft draft-ietf-sfc-use-case-mobility-07, IETF, 2016. https://tools.ietf.org/html/draft-ietf-sfc-use-case-mobility-07.pdf.
J. Dean and S. Ghemawat. MapReduce: Simplified Data Processing on Large Clusters. Proc. OSDI, 2004. https://ai.google/research/pubs/pub62.
J. M. Halpern and C. Pignataro. Service Function Chaining (SFC) Architecture. RFC 7665, Oct. 2015. https://tools.ietf.org/html/rfc7665.

(56) References Cited

OTHER PUBLICATIONS

Zafar Ayyub Qazi, Cheng-Chun Tu, Luis Chiang, Rui Mao, Vyas Sekar and Minlan Yu. SIMPLE-flying Middlebox Policy Enforcement Using SDN. In Proc. SIGCOMM 2013. https://www.cs.duke.edu/courses/cps296.4/fall14/Papers/SIMPLIFY-sigcomm13.pdf.
Ying Zhang, Neda Beheshti, Ludovic Beliveau, Geoffrey Lefebvre, Ramesh Mishra, Ritun Patney, Erik Rubow, Ramesh Subrahmaniam, Ravi Manghirmalani, Meral Shirazipour, Catherine Truchan and Malik Tatipamula. StEERING: A software-defined networking for inline service chaining. In Proc. ICNP 2013. https://www.ericsson.com/en/conference-papers/steering-a-software-defined-networking-for-inline-service-chaining.

* cited by examiner

FIG. 5

CONTROLLING PARALLEL DATA PROCESSING FOR SERVICE FUNCTION CHAINS

This invention was made with government support under CNS1617729, CNS1618339 and CNS1836772 awarded by the National Science Foundation. The government has certain rights in the invention. This invention was made with government support under Grant No. HDTRA1-14-1-0040 awarded by the Defense Threat Reduction Agency (DTRA). The government has certain rights in the invention.

The present disclosure relates generally to network function virtualization (NFV), and relates more particularly to devices, computer-readable media, and methods for controlling parallel data processing for service function chains with network functions.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Network operators can create, update, remove, or scale on/in network functions (NFs) on-demand, construct sequences of NFs to form service function chains (SFCs), and steer traffic through SFCs to meet service requirements.

SUMMARY

Systems, computer-readable media, and methods are disclosed for parallelizing service function chains with a plurality of network functions. An example method comprises receiving a sequential service function chain comprising a plurality of network functions; receiving a plurality of operations associated with the plurality of network functions of the sequential service function chain; determining at least two network functions of the plurality of network functions are capable of being parallelized; aggregating operations of the plurality of operations associated with the at least two network functions into a network function segment; determining whether another network function of the plurality of network functions is capable of being parallelized with the network function segment; based on the determining whether the another network function is capable of being parallelized: aggregating an operation of the plurality of operations associated with the another network function into the network function segment when the another network function is capable of being parallelized with the network function segment, or pushing the network function segment as a completed segment of a hybrid service function chain when the another network function is not capable of being parallelized with the network function segment; and implementing the hybrid service function chain when all of the plurality of network functions of the sequential service function chain have been converted into the hybrid service function chain.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for controlling parallel data processing for service function chains (SFCs) with network functions (NFs), e.g., spanning multiple servers. As discussed above, network function virtualization (NFV) coupled with software defined networking (SDN) revolutionizes networking by allowing network operators to dynamically modify and manage networks. However, virtualization of NFs has also presented many new challenges. For instance, traffic traversing SFCs (i.e., sequences of NFs that are typically traversed in order by data flows) may suffer from reduced throughout and increased latency, relative to physical NFs. Moreover, as the length of an SFC (i.e., the number of NFs spanned by the SFC) increases, so does the overhead of the SFC. SFC chains are only likely to get longer as the flexibility offered by SDN and FV enable more complex network services to be deployed. Some illustrative examples of NFs may include: 1) a probe function, 2) an intrusion detection (IDS) function, 3) a firewall function, 4) a network address translation (NAT) function, 5) a load balancer (LB) function (e.g., a layer 4 (L4) load balancer), 6) a wide area network accelerator (WANx) function, 7) a traffic shaper function, and 8) a proxy function. It should be noted that although the present disclosure may present examples below that involve these NFs, it should be noted that this is not an exhaustive list of NFs that can be deployed in a network. Thus, it should not be interpreted that the present disclosure is limited to this illustrative list of NFs.

Service function chains comprise a sequence of network functions (NFs) that are typically traversed in-order by data flows. Consequently, SFC delay grows linearly with the length of the SFC. However, this delay may be unacceptable for highly latency sensitive applications, particularly when the constituent NFs are virtualized, running on commodity servers.

Examples of the present disclosure leverage a packet processing architecture that, when possible, dynamically distributes packets to VNFs in parallel and merges their output intelligently to ensure the preservation of sequential processing semantics. For example, the controller in the present disclosure automatically converts a sequential service function chain to a hybrid one through an efficient heuristic method. In one example, the controller also generates the forwarding rules not only for the software switches connecting NFs on the same physical machine but also for the physical switches, e.g., hardware switches, connecting several machines (hosting the NFs from the same service chain).

For example, the present processing architecture may mirror packets to NFs in parallel and then intelligently merges the outputs of the NFs. The traffic output by the merge function is identical to the traffic output that would have resulted if the traffic had traversed the NFs in a sequential manner. Since not all VNFs will be eligible for parallelization, examples of the present disclosure identify opportunities for parallelism within a SFC, and the result may end up being a hybrid structure in which some NFs are traversed in sequence while other NFs are traversed in parallel.

For example, a mirror function and a merge function can be used to enable parallel processing by the VNFs. More specifically, the mirror function mirrors or replicates an incoming packet, so that a first copy of the packet can be sent to a first VNF and a second copy of the packet can be sent to a second VNF at the same time. The first VNF and the second VNF may then process their respective copies of the packet simultaneously to produce a first output and a second output, respectively. The merge function obtains the first output and the second output and merges the first output with the second output to produce a single merged output. The single merged output is identical to the output that would have resulted if the original incoming packet had been processed in sequence by the first VNF and the second VNF, but is obtained more quickly through the parallel processing.

Many NFs operate in edge clouds or data centers with clusters of servers. Since NFs tend to require a great deal of resources when handling large volumes of traffic, and since most servers can support up to a limited number of such NFs concurrently, it is likely that a SFC (especially a complex SFC comprising a large number of NFs) may include NFs that run on multiple servers. The dynamics of network services and elastic scalability offered by NFV may also make SFC deployment on a single server impractical in some scenarios. For instance, cellular networks utilize tens of instances in the virtualized evolved packet core (EPC) of long term evolution (LTE) networks. The NFs in these cases are usually distributed over multiple servers, and sometimes even over multiple data centers.

Examples of the present disclosure parallelize packet processing among NFs only if the NFs are independent of each other in a service function chain. Otherwise, the correctness of the network and service policies may be broken. For example, there are several factors that may impact the NF order dependency for service function chaining such as: 1) the operations of read and write of the NFs on data packets; 2) the operation of terminating a data packet flow (e.g., dropped by a firewall) in an NF that affects the correctness/efficiency of the next NF; 3) the operation of packet reconstruction (e.g., merged by a WAN optimizer); and 4) the operation of instantiating an NF into multiple instances and using an load balancer (LB) before the NFs to balance the load.

In one embodiment, the impact of the operations of read and write of the NFs must be considered. To illustrate, the following relationships can be present between NFs based on their operations of packet data, read after read (RAR), read after write (RAW), write after read (WAR) and write after write (WAR). Two NFs that perform RAR and WAR operations can be safely parallelized. Two NFs that perform WAW and RAW operations cannot be parallelized if the packet data that is being written/read in the second NF overlaps with what is written in the first one.

In another embodiment, the impact of the operation of terminating a data packet flow in an NF that affects the correctness/efficiency of the next NF must be considered. To illustrate, in one example when there is a firewall function before a proxy function or an IDS function, parallelization may cause the proxy function or the IDS function to generate reports for flows that may have been dropped by the firewall function, which will affect their correctness. In another example, if there is an LB function after a firewall function, parallel processing will send dropped flows to the LB function which will impact the efficiency of the LB function's load balancing algorithm. For other cases, such as a firewall function before a NAT function, parallelization may increase the resource utilization on the NAT function. In one example, the method may fall back to the sequential processing when the firewall function drops a large number of flows and so on.

In one embodiment, the example table below can be used to illustrate whether various two-NF chains can be parallelized:

|  | Probe | IDS | Firewall | NAT | L4 LB | WANX | Shaper | Proxy |
| --- | --- | --- | --- | --- | --- | --- | --- | --- |
| Probe |  | Y | Y | Y | Y | Y | Y | Y |
| IDS | Y |  | Y | Y | Y | Y | Y | Y |
| Firewall | N | N |  | Y | N | Y | Y | N |
| NAT | N | N | N |  | N | N | N | N |
| L4 LB | N | N | N | N |  | N | N | N |
| WANX | Y | X | X | X | X |  | Y | X |
| Shaper | N | Y | Y | Y | Y | Y |  | Y |
| Proxy | Y | Y | Y | Y | Y | N | Y |  |

The table illustrates the pairwise NF order dependency. More specifically, the NF in the leftmost column is the first one in a chain and the one in the top row is the second one in the chain. The service chains that can be parallelized by the present method are marked with a "Y." Those that cannot be parallelized or do not have a deployment case are marked as "N" and "X," respectively. In one example, all the service function chains that have a NAT function as the first hop are not parallelizable. One reason is that the policy of the next hop (e.g., firewall rules) may be defined on the IP address of the packets from a NAT function. Alternatively, if the policy configuration is implemented in a different manner (e.g., defining the firewall rules on the original source IP address, instead of the IP address assigned by NAT function), many of these chains can be parallelized. In another example, it is assumed that the WANx function is applied to outgoing network traffic and thus should not be deployed before the IDS function, firewall function, or the NAT function. Again, if this assumption is not implemented, then the constraint placed on the parallelization of the NFs can be changed. Thus, the pairwise NF order dependency of the above table is only illustrative and the present disclosure is not limited by this illustrative table.

In one embodiment, a controller implementing an order-dependency analysis function is responsible for generating a SFC layout with parallel components. This layout can be sent to a configuration module which uses the layout to determine how to mirror the traffic to parallel VNF instances. To decide what parts of a service function chain can be parallelized, the order-dependency analysis function may take into account the principles based on NF functionality and configuration (i.e., NF models). The order-dependency analysis function may also consider the actions performed by NFs. For example, a firewall function may terminate a session, but the firewall function should not modify the packets. In contrast, a NAT function may rewrite a packet header, but the NAT function should not terminate a session. In one embodiment, the controller may send selected information of VNFs to the configuration module that is required by the merge function. The present method specifies how to construct a hybrid service function chain using the controller. In one embodiment, the present method automates this process, by converting a sequential service function chain into a hybrid service function chain and generating the forwarding rules not only for the software switches connecting VNFs on the same physical machine but also for the physical switches, e.g., hardware switches, connecting several machines (hosting the VNFs from the same service function chain).

In one example, the present disclosure includes a controller, e.g., a software-defined network (SDN) controller, to control the deployment of services, or functions of a communication network, to parallelize portions of a SFC. In a software defined network, a SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on an SDN node, and released when the router is no longer needed. Similarly, a media server may be instantiated on an SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes.

Figure 1:
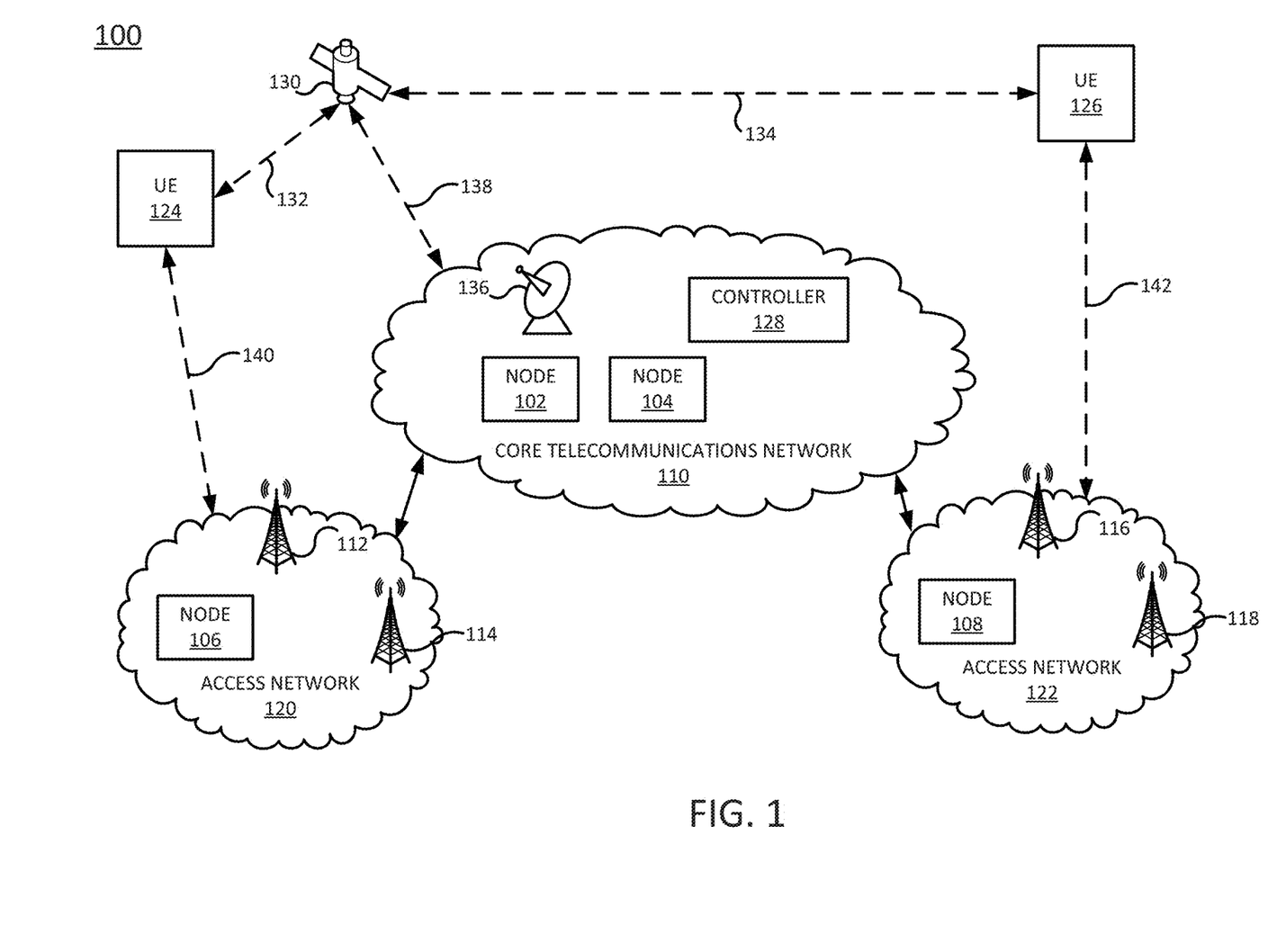
FIG. 1 illustrates an example system related to the present disclosure.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a core telecommunications network 110. In one example, the core telecommunications network 110 may comprise a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs). However, it will be appreciated that the present disclosure is equally applicable to other types of data units and transport protocols, such as Frame Relay, and Asynchronous Transfer Mode (ATM).

In one example, the core telecommunications network 110 uses network function virtualization infrastructure (NFVI), e.g., host devices or servers in a data center or data centers that are available as host devices to host virtual machines comprising virtual network functions (VNFs). In other words, at least a portion of the core telecommunications network 110 may incorporate software-defined network (SDN) components. In the example of FIG. 1, NFVI may be represented by nodes 102 and 104. Nodes 102 and 104 may each include central processing units (CPUs), or processors, memory to hold computer-readable/computer-executable instructions, code, and/or programs, and so forth. Thus, nodes 102 and 104 may comprise host devices that are configurable and reconfigurable to provide various network services and/or to perform various tasks and functions under the instruction of controller 128. For instance, nodes 102 and 104 may host configuration code and/or content for various network services. Nodes 102 and 104 may alternatively or additionally provide transcoding services, performing media compression, or perform any other network functions that may be deployed in a host device/NFVI in a NFV architecture.

In one embodiment, the core telecommunications network 110 may be in communication with one or more access networks 120 and 122. The access networks 120 and 122 may include a wireless network (e.g., an Institute of Electrical and Electronics Engineers (IEEE) 802.11/Wi-Fi network and the like), a cellular network (e.g., 2G, 3G, and 4G networks, a Long Term Evolution (LTE) network, 5G network, and the like), a circuit switched network (e.g., a public switched telephone network (PSTN)), a cable network, a digital subscriber line (DSL) network, a metropolitan area network (MAN), an Internet service provider (ISP) network, and the like. As such, in various examples the access points 112, 114, 116, and 118 may comprise wireless transceivers, cellular base stations, such as eNodeBs, and the like. In one example, the access networks 120 and 122 may include different types of networks. In another example, the access networks 120 and 122 may be the same type of network. In one example, the access networks 120 and 122 may be operated by a same entity as the core telecommunications network 110.

In one example, the access networks 120 and 122 may also include NFVI that is controlled by the controller 128, e.g., nodes 106 and 108. Nodes 106 and 108 may each include central processing units (CPUs), or processors, memory to hold computer-readable/computer-executable instructions, code, and/or programs, and so forth. Thus, nodes 106 and 108 may comprise host devices that are configurable and reconfigurable to provide various network services and/or to perform various tasks and functions under the instruction of controller 128. For instance, nodes 106 and 108 may host configuration code and/or content for various network services. Nodes 106 and 108 may alternatively or additionally provide transcoding services, performing media compression, or perform any other network functions that may be deployed in a host device/NFVI in a NFV architecture.

As illustrated in FIG. 1, the system 100 may further include user endpoint (UE) devices 124 and 126. UEs 124 and 126 may comprise any type of wireless communication-capable mobile telephony and computing device (broadly, a "mobile device"), such as: a mobile phone, a smartphone, a computing tablet, a messaging device, a personal computer, a laptop computer, a Personal Digital Assistant (PDA), a wearable "smart" device (e.g., a smart watch or a fitness tracker), a portable gaming device, and the like. For instance, UEs 124 and 126 may be equipped with at least one cellular radio/transceiver for cellular communications. In another example, UEs 124 and 126 may comprise wired devices capable of communicating over a network, such as a desk top computer, a set top box (STB), a smart television, an Internet of Things (IoT) device (e.g., a smart thermostat, a smart security system, etc.). UEs 124 and 126 may also be equipped for any number of different modes of communication. For instance, UEs 124 and 126 may alternatively or additionally be equipped with an IEEE 802.11 (Wi-Fi) transceiver, an IEEE 802.16 (e.g., wireless metropolitan area network/WiMAX) transceiver, an IEEE 802.15 transceiver (e.g., Bluetooth, ZigBee, etc.), and so on.

In one example, the nodes 102-108 may be managed by the controller 128. In one example, controller 128 may comprise an SDN controller that is responsible for such functions as provisioning and releasing instantiations of VNFs to perform the functions of routers, switches, and other devices, provisioning routing tables and other operating parameters for the VNFs, generating and pushing packet forwarding rules to switches, and so forth. In one example, controller 128 may maintain communications with VNFs and/or nodes 102-108 via a number of control links. Control links may comprise secure tunnels for signaling communications over an underling IP infrastructure of core telecommunications network 110 and/or access networks 120 and 122. In other words, control links may comprise virtual links multiplexed with transmission traffic and other data carried over a shared set of physical links. In one example, the controller 128 may also comprise a virtual machine operating on NFVI/host device(s), or may comprise a dedicated device. For instance, controller 128 may be collocated with one or more VNFs, or may be deployed in a different host device or at a different physical location. In one example, the controller 128 may comprise a computing system or server, such as computing system 500 depicted in FIG. 5, and may be configured to establish parallel data processing for SFCs with NFs spanning multiple servers, as described herein. For instance, the controller 128 may be configured to perform the steps, functions, and/or operations of the method 300 and method 400, described below, to generate a hybrid service function chain and/or forwarding rules for hardware and/or software switches in the SFCs that may span over multiple servers, and/or to perform any other functions described herein.

In accordance with the present disclosure, the management functions of controller 128 may include generating a hybrid service function chain that facilitates parallelization. Further management functions of controller 128 may include determining a forwarding rule generation scheme that automatically creates rules for both software and/or hardware switches and enforces the rules appropriately.

As illustrated in the example of FIG. 1, UEs 124 and 126 may communicate with satellite 130 via satellite links 132 and 134, respectively. In another example, UEs 124 and 126 may be limited to receiving low-bandwidth downlink communications. For instance, UEs 124 and 126 may include GPS receivers for receiving GPS broadcasts from satellite 130. In one example, satellite 130 may communicate with a ground station 136 via satellite link 138. In one example, satellite 130 may be controlled and/or operated by a same network service provider as core telecommunications network 110. In another example, satellite 130 may be controlled and/or operated by a different entity and may carry communications between UEs 124 and 126 and core telecommunications network 110.

As further illustrated in FIG. 1, UEs 124 and 126 may be within communication range of access networks 120 and 122, respectively via links 140 and 142. For instance, links 140 and 142 may comprise cellular links to access points 112 and 116 respectively, which may comprise eNodeBs in such an example.

UEs 124 and 126 may request services from core telecommunications network 110 via links 140 and 142, access points 112 and 116, and access networks 120 and 122, respectively. In one example, the service requests may be processed by controller 128. The service requests may be for a voice or video call service, a conference call service, a streaming media service, a data access service, an Internet access service, and so forth. Each of the service requests may include an identification of the requesting UE, the service requested, any content requested in addition to the service, a bandwidth requirement, a latency requirement, and so forth.

It should be noted that the system 100 has been simplified. In other words, the system 100 may be implemented in a different form than that illustrated in FIG. 1. For example, the system 100 may be expanded to include additional networks, and additional network elements (not shown) such as border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices. Thus, these and other modifications of the system 100 are all contemplated within the scope of the present disclosure.

Figure 2:
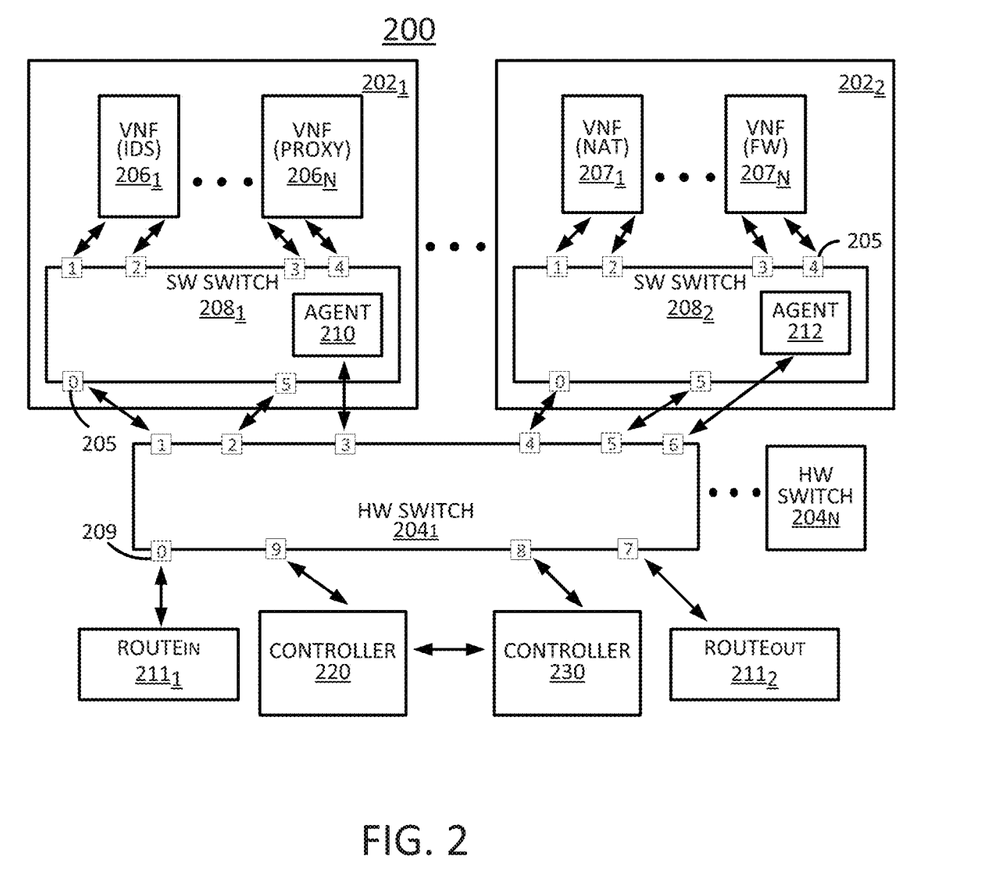
FIG. 2 illustrates an example configuration through which parallel processing may be deployed in a hybrid service function chain.

In one alternate embodiment, the present disclosure presents an architecture where two controllers 220 and 230 are deployed as shown in FIG. 2. For example, controller 220 is a hardware switch controller, e.g., an OpenFlow controller, and controller 230 is an SDN controller. The architecture utilizes one or more hardware switches $204_{1-N}$, (hereinafter collectively referred to as "hardware (HW) switches 204") e.g., OpenFlow switches and one or more software switches $208_{1-N}$ (hereinafter collectively referred to as "software (SW) switches 208"). It should be noted that a service instance (e.g., $202_1$ or $202_2$) of the data plane may operate on a physical machine running a software switch and a few VNFs. Namely, the first SW switch $208_1$ and the second SW switch $208_2$ may cooperate with the HW switch $204_1$ to forward traffic (e.g., packets) to the appropriate VNFs 206 or 207, e.g., according to forwarding rules that are generated by a controller such as the controller 128 of FIG. 1 or controller 230 of FIG. 2.

For instance, in one example, each service instance 202 (can also be referred to as a "physical machine" or "server" below) may include a local agent or daemon (e.g., 210 or 212) that communicates with the controller 230. The local agent may receive forwarding rules from the controller 230 and push the forwarding rules to the SW switches 208 on the service instances 202. At least some of the forwarding rules may enable parallel packet processing by the VNFs 206 and/or 207. The local agent may also report the run-time state of the data plane and system load information in response to queries from the controller 230.

In further examples, the controller 230 may also inform the data plane of the operations of the VNFs 206 and 207. This is useful if, for instance, certain VNFs 206 and 207 add or delete bytes in the data packets (e.g., bytes indicating a virtual local area network (VLAN) ID) which may be needed by the data plane to correctly merge the outputs of parallelized VNFs 206 and/or 207. In addition, VNFs 206 and/or 207 that do not modify packets (e.g., traffic shapers) may use information about other VNF operations in order to optimize the merge function.

In one example, the HW switch 204 may employ more coarse-grained forwarding rules, since NF-level traffic steering is typically performed by the software switches 208. As such, the HW switch 204 may not need to know the more fine-grained traffic forwarding details.

In one example, the controller 230 may take charge of several roles, e.g.,: a) taking SFC policy rules and VNF manifest files as input, and converting a sequential SFC to a hybrid SFC; b) pre-installing hybrid SFC forwarding rules into software switches of the data plane, to assist a service instance in steering packets in a hybrid SFC; and c) interacting with the controller 220 to install rules into hardware switches 204 for steering SFC traffic across multiple machines, if necessary. In one embodiment, the hardware switches 204 are serving as network entities tasked with forwarding traffic based on rules installed by the hardware controller 220. It should be noted that in one embodiment the hardware controller 220 can be deemed to be optional (i.e., omitted) and its functions can be implemented by the controller 230 instead. However, if the architecture has already deployed a hardware controller 220 for configuring the hardware switches 204, then it may be more efficient to simply deploy controller 230 for generating the hybrid service function chain that facilitates parallelization and coordinating with the hardware controller 220 for interacting with the hardware and software switches.

In one example, the HW switch 204 may be a P4 open-source programming language switch, which exposes a standard set of primitive actions (including bit_or and bit_xor). However, other types of switches may also be used for the HW switch 204.

In one embodiment, the input to the controller 230 may include policy rules that a network administrator may want to be enforced, and NF manifest files that describe NF features such as whether a NF modifies packet header fields or adds additional header fields. The present hybrid SFC construction method will ensure that the packets outputted through a hybrid SFC will be the same as if the packets have undergone a sequential SFC. Since one objective of the present disclosure is to convert a sequential SFC into a hybrid SFC to reduce per-packet latency, the present method will try to parallelize as many NFs whenever possible.

Based on the dependency policies defined above, the present disclosure presents an illustrative greedy algorithm, as shown in Algorithm 1 below. In order to model the present hybrid chain construction algorithm, six available operations in the NF manifest are specified: 1) NF reads packet header (HR); 2) NF modifies packet header (HW); 3) NF adds/removes bits into/from packet header (HAR); 4) NF reads packet payload (i.e., beyond the TCP header) (PR); 5) NF modifies packet payload (PW); and 6) NF terminates transaction (T). An NF may be attached with multiple operations, e.g., IDS function may be attached with both HR and PR operations. In one embodiment, these operations are used in the present hybrid service function chain construction algorithm in order to preserve the correctness of hybrid service function chain.

One approach of the hybrid service function chain construction algorithm is to parallelize two consecutive NFs restrained by the order dependency rules. If any two consecutive NFs are parallelizable, then the hybrid service function chain construction algorithm treats them as a larger NF with aggregated operations for further aggregation. The correctness of the hybrid service function chain construction algorithm stems from two factors: 1) two NFs are only parallelized when there is no dependency between the two NFs, and 2) after these two NFs are parallelized, their feature operations are aggregated together for dependency checking with next NF and so on.

Algorithm 1 below illustrates one implementation of the present hybrid service function chain construction algorithm.

---

Algorithm 1 Construction of Hybrid Chain

Variable Definition: (a) SC: sequential chain (input);
   (b) NF_Ops: operations of NF (input); (c) NF_Seg:
   current NF segment; (d) Agg_Ops: aggregated operations of current segment; (e) HC: hybrid chain
   (output)
 1: procedure CONSTRUCT_HYBRID_CHAIN
 2:   initiate NF_Seg,Agg_Ops,HC
 3:   while $NF_i$ in SC do
 4:     NF_Ops ← Fetch_Ops($NF_i$)
 5:     if Independent (NF_Ops, Agg_Ops) then
 6:       NF_Seg.push($NF_i$)
 7:       Agg_Ops.push(NF_Ops)
 8:     else
 9:       HC.push(NF_Seg)
10:       NF_Seg.clear( )
11:       Agg_Ops.clear( )
12:       NF_Seg.push($NF_i$)
13:       Agg_Ops.push(NF_Ops)
14:   HC.push(NF_Seg)

---

To illustrate, the inputs of the hybrid service function chain construction algorithm comprise a sequential chain SFC and the operations (NF_Ops) of SFC's NFs extracted from the specifications of NF behavior. If $NF_i$ is parallelizable with the current NF segment (NF_Seg, i.e., having independent ordering which is derived from their operations), the hybrid service function chain construction algorithm pushes or aggregates $NF_i$ into NF_Seg and aggregates $NF_i$' operations into Agg_Ops (e.g., lines 6-7 of algorithm 1). Otherwise, the hybrid service function chain construction algorithm pushes NF_Seg into the output hybrid service function chain (HC) as a completed segment, clears NF_Seg and Agg_Ops, and then pushes $NF_i$ into NF_Seg and its operations into Agg_Ops for the order-dependency check with the next NF (e.g., lines 9-13 of algorithm 1).

An example is now provided to illustrate the execution of above algorithm 1. Suppose a sequential service function chain has with six NFs: A→B→C→D→E→F. Let's assume this sequential service function chain consists of two parallel network function segments: {A, B} and {D, E, F}. Given this, Agg_Ops is empty when the algorithm 1 begins. As the Independent( ) function returns TRUE, the algorithm 1 pushes A into NF_Seg and its operations into Agg_Ops. Since A and B are parallelizable, the algorithm 1 pushes B and its operations into NF_Seg and Agg_Ops, respectively. As a result, NF_Seg becomes {A, B}. Since C is not parallelizable with A and B, algorithm 1 pushes the current segment {A, B} into the output HC before handling C and its operations. The next NF is D which is not parallelizable with C. The algorithm 1 thus pushes the current segment with a single component C into the output HC, turning it into {{A, B}, C}. Continuing in this fashion with D, E and F, algorithm 1 pushes the last parallel segment {D, E, F} into the output HC. Thus, the output HC of algorithm 1 in this illustrative case turns out to be {{A, B}, C, {D, E, F}}.

Figure 3:
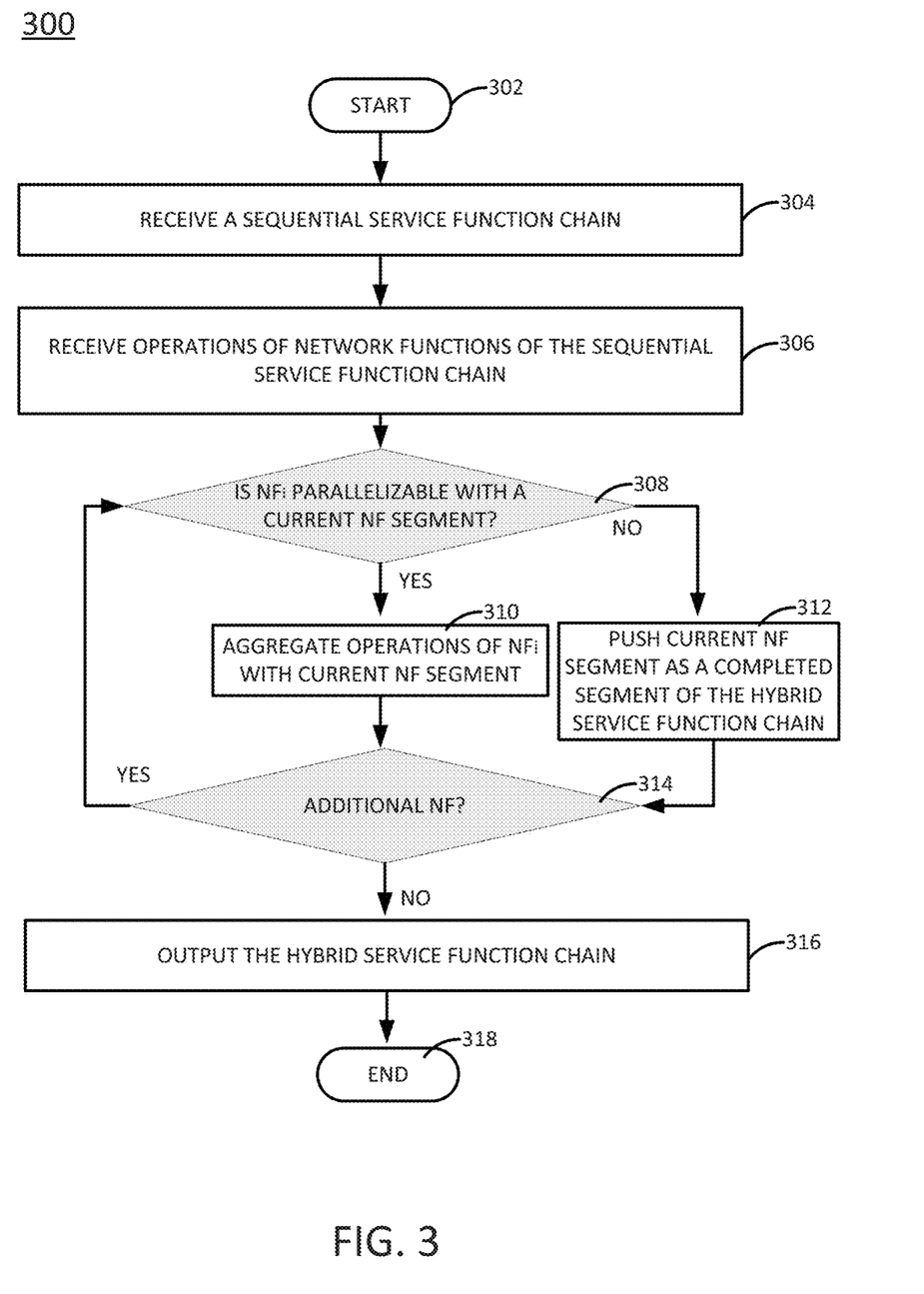
FIG. 3 illustrates a flowchart of an example method for generating a hybrid service function chain in accordance with the present disclosure.

FIG. 3 illustrates a flowchart of an example method 300 for generating a hybrid service function chain in accordance with the present disclosure. In one example, steps, functions and/or operations of the method 300 may be performed by a controller, e.g., controller 128 (or controller 230 of FIG. 2) in conjunction with other components of the system 100. In one example, the steps, functions, or operations of method 300 may be performed by a computing device or system 500, and/or processor 502 as described in connection with FIG. 5 below. For example, computing device or system 500 may represent an SDN controller. For illustrative purposes, the method 300 is described in greater detail below in connection with an example performed by a processor, such as processor 502.

In one example, the method 300 implements the hybrid service function chain construction algorithm (e.g., example algorithm 1) as discussed above. Namely, method 300 analyzes a sequential SFC and the operations of the SFC's NFs to determine whether at least two of the SFC's NFs can be parallelized. If at least two of the SFC's NFs can be parallelized, then a hybrid service function chain will be constructed. Thus, a hybrid service function chain is broadly defined as having at least two NFs from a SFC that have been parallelized.

Referring back to FIG. 3, the method begins in step 302 and proceeds to step 304. In step 304, the processor may receive a sequential service function chain. For example, an SDN controller may receive a sequential service function chain having a plurality of network functions for the purpose of creating a hybrid service function chain.

In step 306, the processor may receive operations of the plurality of network functions of the sequential service function chain. For example, the inputs to the hybrid service function chain construction algorithm comprise the sequential chain SFC as received in step 304 and the operations of the SFC's NFs extracted from the specifications of NF behavior.

In step 308, the processor broadly determines whether two consecutive NFs functions of the sequential service function chain can be parallelized, e.g., whether a first NF is parallelizable with a second NF of the sequential service function chain. Said another way, the processor broadly determines whether an $NF_i$ can be parallelized, with a current NF segment, where the current NF segment comprises one or more NFs that are currently considered to be parallelizable. If the query is answered positively, method 300 proceeds to step 310. If the query is answered negatively, method 300 proceeds to step 312.

In step 310, the method 300 aggregates the operations of $NF_i$ with the current NF segment. In other words, if $NF_i$ is parallelizable with the current NF segment (NF_Seg, i.e., having independent ordering which is derived from their operations), the hybrid service function chain construction algorithm pushes or aggregates $NF_i$ into NF_Seg and aggregates $NF_i$' operations into Agg_Ops (e.g., see lines 6-7 of algorithm 1).

In step 312, the method 300 pushes the NF segment as a completed segment of the hybrid service function chain. In other words, the hybrid service function chain construction algorithm pushes the NF_Seg into the output hybrid service function chain (HC) as a completed segment, clears NF_Seg and Agg_Ops, and then pushes $NF_i$ into NF_Seg and its operations into Agg_Ops for the order-dependency check with the next NF (e.g., see lines 9-13 of algorithm 1).

In step 314, the method 300 determines whether there is another NF in the sequential service function chain that can be parallelized. If the query is answered positively, method 300 returns to step 308 for the next $NF_{i+1}$. In other words, $NF_{i+1}$ will be analyzed to determine whether $NF_{i+1}$ can be parallelized with the current NF segment. If the query is answered negatively, method 300 proceeds to step 316.

In step 316, the method 300 will output the constructed hybrid service function chain corresponding to the sequential service function chain received in step 304. For example, the constructed hybrid service function chain can be provided to and implemented by a controller, e.g., an SDN controller. In other words, the hybrid service function chain will be implemented when all network functions of the sequential service function chain have been converted into the hybrid service function chain, i.e., when no remaining network functions of the sequential service function chain can be parallelized. In other word, any remaining non-parallelized network functions of the sequential service function chain will be pushed into the constructed hybrid service function chain as an un-parallelized segment along with any completed parallelized segment as discussed above in step 310. Method 300 then ends in step 318.

In one embodiment, a data plane may consist of several service instances, where each instance is running on an individual physical machine. Upon interaction with the data plane, the controller 230 is responsible for installing the constructed hybrid SFC to service instance(s). In some cases, a hybrid SFC needs to be installed into multiple service instances, since VNFs are distributed across multiple machines. The communication between controller 230 and service instances $202_{1-2}$ is through an agent (e.g., 210 or 212) residing in software switch $208_1$ or $208_2$. Run-time system information such as system load and available resources can also be fetched from the agent. This information is utilized to guide flow steering in a hybrid SFC when duplicated VNF instances are under controller control. Such information can also be used to provision new VNFs in a service instance to scale system utilization.

In one embodiment, since data plane is distributed across multiple machines in a network, the controller 230 may need to coordinate with controller 220, e.g., an OpenFlow controller, to specify steering policies into the hardware switches $204_{1-N}$, e.g., OpenFlow switches, to ensure that a hybrid SFC will operate as expected. In one example, the role of controller 230 is to install rules into the data plane via the controller 220. Thus, the controller 230 may need to maintain the following information: 1) global view of the network; 2) location of one or more service instances in the network (more specifically, which hardware switch 204 is connected to which service instance 202 in the network); and 3) VNFs $206_{1-n}$ (hereinafter collectively referred to as "VNFs 206") and $207_{1-n}$ (hereinafter collectively referred to as "VNFs 207") running in each service instance 202. Given such information, controller 230 can then specify the steering policy to support a constructed hybrid SFC.

FIG. 2 illustrates an example configuration through which parallel processing may be deployed in a hybrid service function chain. Using FIG. 2, the operations of the controller 230 can be described in an illustrative use case. In one example, there are four VNFs (e.g., two VNFs 206 and two VNFs 207) distributed in two physical machines $202_{1-2}$, e.g., servers (hereinafter collectively referred to as "physical machines or servers 202"). Moreover, it should be noted that although two physical machines 202 are illustrated, the system 200 may include any number of physical machines greater than one. Thus, the system 200 may comprise a part of a larger system. It should also be noted that the present disclosure may refer to the two physical machines $202_{1-2}$ as service instances in certain illustrative examples. The two physical machines are connected to a hardware switch $204_1$, e.g., an OpenFlow switch. In this example, the packets of the NFs (e.g., IDS, NAT, and FW) are processed in parallel and then the merged packets after the parallel VNF processing are forwarded to NF Proxy. Thus, the hybrid policy or hybrid service function chain of {{IDS, NAT, FW}, Proxy} needs to be installed into the software switches $208_{1-2}$ on two physical machines. For ease of exposition, FIG. 2 only shows the service instances connected to only one hardware switch $204_1$, e.g., an OpenFlow switch. However, the present method will also work for multiple hardware switches, e.g., multiple OpenFlow switches.

In one embodiment, information pertaining to the hardware and software switches can be presented and stored in one or more corresponding tables, e.g., in "OpenFlow Switch INFO Table" and "Soft Switch INFO Table." Similarly, policies (e.g., if_(match(tcp, dstport=80) IDS>>NAT>>FW>>Proxy>>fwd(R_out)) installed into the controller 230 can be presented and stored in a "Policies Table." For example, traffic is coming from Route InZone $211_1$, and going out to Route OutZone $211_2$, after going through four VNFs (e.g., IDS, NAT, FW, and Proxy) in an order corresponding to an original sequential service function chain.

For example, the controller 230 needs to pre-install hardware rules, e.g., OpenFlow rules, into the hardware switch $204_1$, e.g., OpenFlow switches, through the controller 220, e.g., an OpenFlow controller. Since controller 230 has a global view of the network from both the VNF side and the OpenFlow side, controller 230 can calculate the OpenFlow rules to be installed to support the SFC steering policy across multiple machines. In one embodiment, virtual LAN (VLAN) ID can be used as a tag to assist forwarding flows in the hardware switch. VLAN tagging is a method through which more than one VLAN can be handled on a port.

In one embodiment, the present hybrid service function chain construction algorithm may construct a hybrid service function chain that is presented and stored in a "Hybrid Steering table" after importing the corresponding VNF manifest files from the corresponding "NF Table" using the above discussed Algorithm 1. In turn, the controller 230 may install the steering rules into the Hybrid Steering table of the software switches $208_{1-2}$ in order for packets to go through the VNFs at both parallel and sequential ways as specified in a constructed hybrid SFC. The controller 230 may also need to map VNF information with software switch ports (collectively illustrated with a single reference numeral 205).

For example, on software switch $208_1$, the corresponding rule {{1, 5_2}, {3}, {5}} installed into the "Steering Table" for software switch $208_1$ may indicate that traffic needs to be mirrored to port 1 and port 5, and set VLAN ID as 2 for packets going out through port 5 interacting with port 2 (209) of hardware switch $204_1$. The VLAN ID is used to match desired hardware switch rules installed by the controller 230. After packets going out from port 5 on software switch $208_1$, the packets will reach port 0 on software switch $208_2$ interacting with port 4 (209) through the hardware switch $204_1$. In turn, the execution engine on software switch $208_2$ mirrors packets to ports 1 and 3 as indicated in the "Steering Table" for software switch $208_2$. The output packets processed by NAT and FW are then merged and the execution engine fetches port information in the next brace, i.e., port 5. The local parallelism implemented on software switch $208_2$ is now completed. Data packets are sent back to software switch $208_1$ through the hardware switch $204_1$. Finally, software switch $208_1$ merges the packet from software switch $208_2$ with the output packets from IDS and steers the merged packets to port 3 and 5 sequentially which are then processed by the Proxy.

Figure 4:
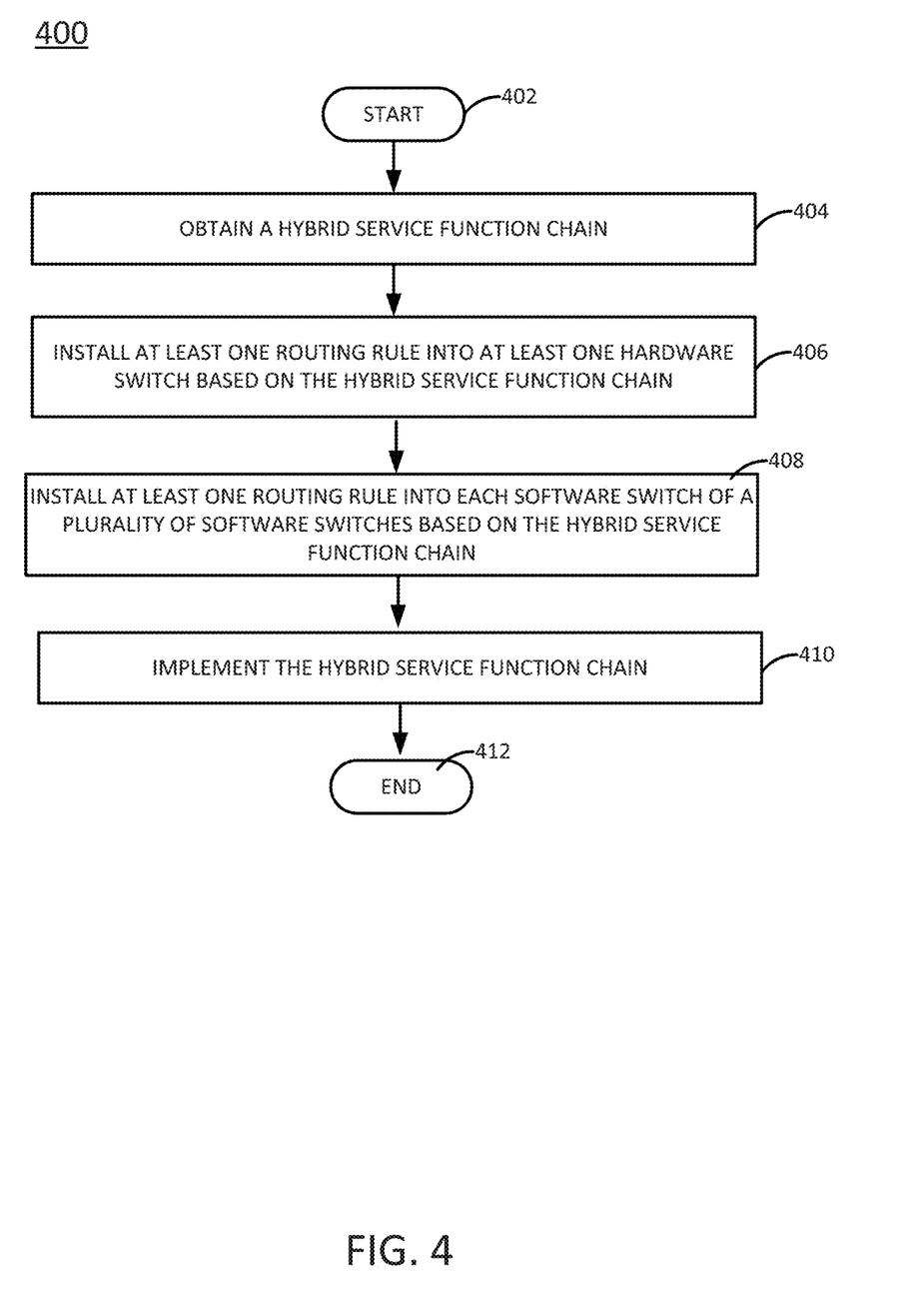
FIG. 4 illustrates a flowchart of an example method for configuring a network for implementing a hybrid service function chain in accordance with the present disclosure.

FIG. 4 illustrates a flowchart of an example method 400 for configuring a network for implementing a hybrid service function chain in accordance with the present disclosure. In one example, steps, functions and/or operations of the method 400 may be performed by a controller, e.g., controller 128 (or controller 230 of FIG. 2) in conjunction with other components of the system 100. In one example, the steps, functions, or operations of method 400 may be performed by a computing device or system 500, and/or processor 502 as described in connection with FIG. 5 below. For example, computing device or system 500 may represent an SDN controller. For illustrative purposes, the method 400 is described in greater detail below in connection with an example performed by a processor, such as processor 502.

Referring back to FIG. 4, the method begins in step 402 and proceeds to step 404. In step 404, the processor may obtain a hybrid service function chain that is constructed from a sequential service function chain as discussed in method 300 above. For example, an SDN controller may have constructed the hybrid service function chain by itself or the SDN controller may have received the hybrid service function chain from another network component, e.g., a network service provisioning component.

In step 406, the method 400 installs at least one routing rule into at least one hardware switch for steering SFC traffic, e.g., across multiple machines, if necessary. In one embodiment, the hardware switches 204 are serving as network entities tasked with forwarding traffic based on rules installed by the hardware controller 220 or SDN controller 230.

In step 408, the method 400 installs at least one routing rule into each software switch of a plurality of software switches for steering SFC traffic. In one embodiment, the method 400 installs hybrid SFC forwarding rules into the software switches of the data plane, to assist a service instance in steering packets in the hybrid SFC.

In step 410, the method 400 implements the hybrid SFC once the routing rules have been installed on the at least one hardware switch and the plurality of software switches. Namely, the hybrid SFC can be implemented to provide a service to one or more customers of the network. Method 400 then ends in step 412.

It should be noted that the method 300 and method 400 may be expanded to include additional steps. It should also be noted that although not specifically specified, one or more steps, functions or operations of the method 300 and method 400 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 3 and 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 and method 400 may comprise optional steps, or can be combined, separated, and/or performed in a different order from that described above, without departing from the example embodiments of the present disclosure.

As such, the present disclosure provides at least one advancement in the technical field of network function virtualization (NFV). For instance, examples of the present disclosure determine a manner of generating a hybrid service function chain from a sequential service function chain. Further examples of the present disclosure determine a manner of deploying the hybrid service function chain in one or more servers. For example, the method may employ a forwarding rule generation scheme that automatically creates rules for both software and hardware switches and enforces the rules appropriately in accordance with the constructed hybrid service function chain.

Figure 5:
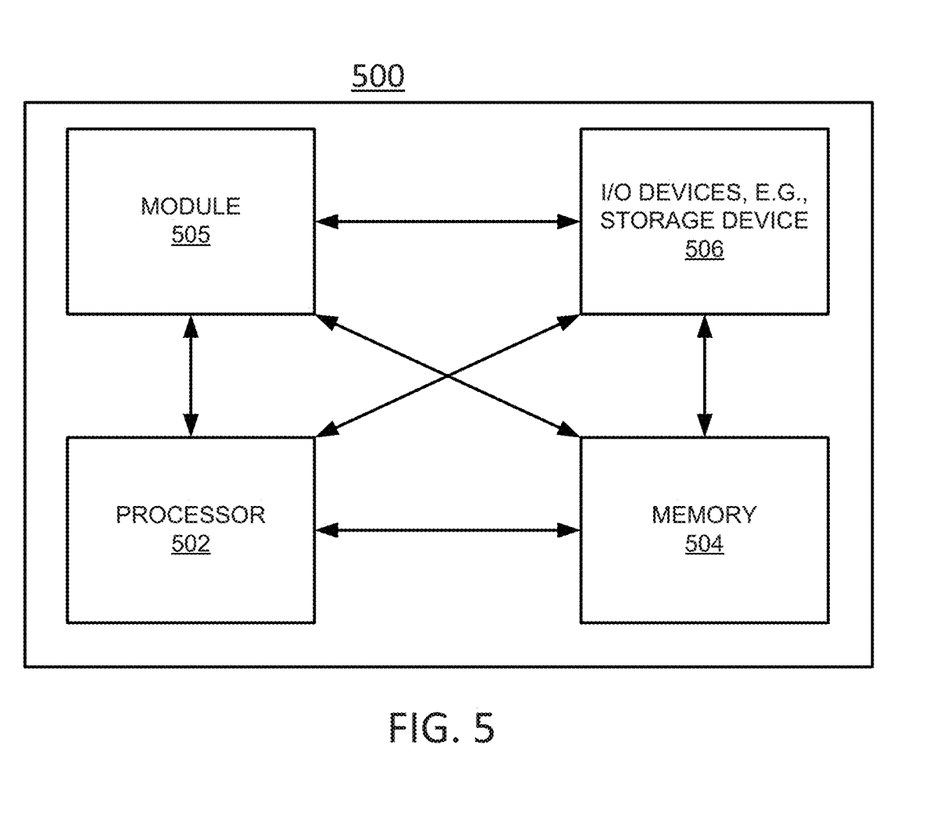
FIG. 5 illustrates an example high-level block diagram of a computer specifically programmed to perform the steps, functions, blocks, and/or operations described herein.

FIG. 5 depicts a high-level block diagram of a computing device programmed, or configured to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for generating a hybrid service function chain, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 or method 400 as discussed above is implemented in a distributed or parallel manner for a particular illustrative example, i.e., the steps of the above method 300 or method 400, or the entire method 300 or method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method(s) discussed above can be used to configure a hardware processor to perform the steps, functions and/or operations of the above disclosed method 300 or method 400. In one embodiment, instructions and data for the present module or process 505 for generating a hybrid service function chain (e.g., a software program comprising computer-executable instructions) can be loaded into memory 504 and executed by hardware processor element 502 to implement the steps, functions or operations as discussed above in connection with the illustrative method 300 or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for generating a hybrid service function chain (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a processor, a sequential service function chain comprising a plurality of network functions, wherein the plurality of network functions spans a plurality of servers;
receiving, by the processor, a plurality of operations associated with the plurality of network functions of the sequential service function chain;
determining, by the processor, at least two network functions of the plurality of network functions are capable of being parallelized;
aggregating, by the processor, operations of the plurality of operations associated with the at least two network functions into a network function segment;
determining, by the processor, whether another network function of the plurality of network functions is capable of being parallelized with the network function segment;
based on the determining whether the another network function is capable of being parallelized:
 aggregating, by the processor, an operation of the plurality of operations associated with the another network function into the network function segment when the another network function is capable of being parallelized with the network function segment; or
 aggregating, by the processor, the network function segment as a completed segment of a hybrid service function chain when the another network function is not capable of being parallelized with the network function segment;
automatically installing, by the processor, at least one first routing rule into each software switch of a plurality of software switches for steering traffic associated with the hybrid service function chain, wherein each software switch of the plurality of software switches runs on one server of the plurality of servers; and
automatically installing, by the processor, at least one second routing rule into at least one hardware switch for steering traffic associated with the hybrid service function chain, wherein the at least one hardware switch cooperates with the plurality of software switches to forward traffic to the plurality of network functions; and
implementing, by the processor, the hybrid service function chain when all of the plurality of network functions of the sequential service function chain have been converted into the hybrid service function chain and when the at least one first routing rule has been installed into the each software switch and when the at least one second routing rule has been installed into the at least one hardware switch.

2. The method of claim 1, wherein the processor comprises a software defined network processor.

3. The method of claim 1, wherein the receiving the plurality of operations comprises extracting the plurality of operations from a plurality of files describing features of the plurality of network functions.

4. The method of claim 1, wherein the plurality of network functions comprises a plurality of virtual network functions.

5. The method of claim 4, wherein the operations of the at least two network functions of the network function segment are implemented over two service instances.

6. The method of claim 5, wherein the two service instances are implemented over two separate physical machines.

7. The method of claim 6, wherein the two separate physical machines comprise two separate servers.

8. The method of claim 1, wherein the determining the at least two network functions of the plurality of network functions are capable of being parallelized comprises determining that the at least two network functions are independent of each other in the sequential service function chain.

9. A system comprising:
a processor; and
a computer-readable medium storing instructions which, when executed by the processor, cause the processor to perform operations, the operations comprising:
receiving a sequential service function chain comprising a plurality of network functions, wherein the plurality of network functions spans a plurality of servers;
receiving a plurality of operations associated with the plurality of network functions of the sequential service function chain;
determining at least two network functions of the plurality of network functions are capable of being parallelized;
aggregating operations of the plurality of operations associated with the at least two network functions into a network function segment;
determining whether another network function of the plurality of network functions is capable of being parallelized with the network function segment;
based on the determining whether the another network function is capable of being parallelized:
aggregating an operation of the plurality of operations associated with the another network function into the network function segment when the another network function is capable of being parallelized with the network function segment; or
aggregating the network function segment as a completed segment of a hybrid service function chain when the another network function is not capable of being parallelized with the network function segment;
automatically installing at least one first routing rule into each software switch of a plurality of software switches for steering traffic associated with the hybrid service function chain, wherein each software switch of the plurality of software switches runs on one server of the plurality of servers; and
automatically installing at least one second routing rule into at least one hardware switch for steering traffic associated with the hybrid service function chain, wherein the at least one hardware switch cooperates with the plurality of software switches to forward traffic to the plurality of network functions; and
implementing the hybrid service function chain when all of the plurality of network functions of the sequential service function chain have been converted into the hybrid service function chain and when the at least one first routing rule has been installed into the each software switch and when the at least one second routing rule has been installed into the at least one hardware switch.

10. The system of claim 9, wherein the processor comprises a software defined network processor.

11. The system of claim 9, wherein the receiving the plurality of operations comprises extracting the plurality of operations from a plurality of files describing features of the plurality of network functions.

12. The system of claim 9, wherein the plurality of network functions comprises a plurality of virtual network functions.

13. The system of claim 12, wherein the operations of the at least two network functions of the network function segment are implemented over two service instances.

14. The system of claim 13, wherein the two service instances are implemented over two separate physical machines.

15. The system of claim 14, wherein the two separate physical machines comprise two separate servers.

16. The system of claim 9, wherein the determining the at least two network functions of the plurality of network functions are capable of being parallelized comprises determining that the at least two network functions are independent of each other in the sequential service function chain.

17. A non-transitory computer-readable medium storing instructions which, when executed by a processor, cause the processor to perform operations, the operations comprising:
receiving a sequential service function chain comprising a plurality of network functions, wherein the plurality of network functions spans a plurality of servers;
receiving a plurality of operations associated with the plurality of network functions of the sequential service function chain;
determining at least two network functions of the plurality of network functions are capable of being parallelized;
aggregating operations of the plurality of operations associated with the at least two network functions into a network function segment;
determining whether another network function of the plurality of network functions is capable of being parallelized with the network function segment;
based on the determining whether the another network function is capable of being parallelized:
aggregating an operation of the plurality of operations associated with the another network function into the network function segment when the another network function is capable of being parallelized with the network function segment; or
aggregating the network function segment as a completed segment of a hybrid service function chain when the another network function is not capable of being parallelized with the network function segment;
automatically installing at least one first routing rule into each software switch of a plurality of software switches for steering traffic associated with the hybrid service function chain, wherein each software switch of the plurality of software switches runs on one server of the plurality of servers; and automatically installing at least one second routing rule into at least one hardware switch for steering traffic associated with the hybrid service function chain, wherein the at least one hardware switch cooperates with the plurality of software switches to forward traffic to the plurality of network functions; and implementing the hybrid service function chain when all of the plurality of network functions of the sequential service function chain have been converted into the hybrid service function chain and when the at least one first routing rule has been installed into the each software switch and when the at least one second routing rule has been installed into the at least one hardware switch.

18. The non-transitory computer-readable medium of claim 17, wherein the processor comprises a software defined network processor.

19. The non-transitory computer-readable medium of claim 17, wherein the receiving the plurality of operations comprises extracting the plurality of operations from a plurality of files describing features of the plurality of network functions.

20. The non-transitory computer-readable medium of claim 17, wherein the plurality of network functions comprises a plurality of virtual network functions.

* * * * *